(12) United States Patent
DeRose (10) Patent No.: US 7,001,101 B1
(45) Date of Patent: Feb. 21, 2006

(54) INTERLOCKING PAVER/TILE (76) Inventor: Gary Phillip DeRose, 6170 Parallel St., Anderson, CA (US) 96007

(*) Notice: Subject to any disclaimer, the term of this patent is extended or adjusted under 35 U.S.C. 154(b) by 22 days.

(21) Appl. No.: 11/090,802

(22) Filed: Mar. 24, 2005

Related U.S. Application Data (60) Provisional application No. 60/636,779, filed on Dec. 15, 2004.

(51) Int. Cl.
*E01C 5/02* (2006.01)
(52) U.S. Cl. ............... 404/40; 404/39; 404/36; 404/34; 405/15
(58) Field of Classification Search ......... 404/34–40; 405/17–20, 15, 16
See application file for complete search history.

(56) References Cited

U.S. PATENT DOCUMENTS

| | | | | |
|---|---|---|---|---|
| 69,297 A | * | 9/1867 | Stafford | 404/39 |
| 91,158 A | * | 6/1869 | Paul | 404/39 |
| 94,066 A | * | 8/1869 | Betteley | 404/39 |
| 487,652 A | * | 12/1892 | Turley | 404/39 |
| 2,505,509 A | * | 4/1950 | Varela | 160/229.1 |
| 3,148,482 A | * | 9/1964 | Neale | 52/390 |
| 3,238,682 A | * | 3/1966 | Tracy et al. | 404/18 |
| 4,169,688 A | * | 10/1979 | Toshio | 404/40 |
| 5,615,971 A | * | 4/1997 | Boev e | 404/37 |
| 6,739,797 B1 | * | 5/2004 | Schneider | 404/35 |
| 6,913,645 B1 | * | 7/2005 | McNulty, Jr. | 106/817 |

* cited by examiner

Primary Examiner—Raymond W Addie (57) ABSTRACT

Interlocking paver system for the use of constructing sidewalks, pathways and decks being formed from a light weight material for easy handling. Joined together by a plastic spline with gripping teeth, which when placed in spline receiver slots on sides of paver, which has a protruding upper edge that surrounds the entire perimeter allowing the pavers to tilt up or down, which allows the pavers to be placed on uneven or unlevel surfaces and prevents pavers from separating and from moving side to side, back and forth, and from settling downward and lifting upward which establishes a stable walking surface that is easy to install or assemble.

2 Claims, 8 Drawing Sheets

INTERLOCKING PAVER/TILE

CROSS REFERENCE TO RELATED APPLICATIONS

This is a continuation of Ser. No. 60/636,779, filed on Dec. 15, 2004, and is also based on provisional application Ser. No. 60/636,779, filed on Dec. 15, 2004.

STATEMENT REGARDING FEDERALLY SPONSORED RESEARCH OR DEVELOPMENT

Not Applicable

DESCRIPTION OF ATTACHED APPENDEX

Not Applicable

BACKGROUND OF THE INVENTION

This invention relates generally to the field of sidewalks and pathways and patios and more specifically to interlocking paver/tile.

Current methods used to install concrete paver tiles are to place the tile onto the dirt surface of the yard, spacing them with a gage or visually spacing them. The voids created by the spacing are either filled with sand or dirt, allowing for easy removal and replacement. This method does not allow for a stable walking surface and fails to provide means to prevent pulling apart or separating and from sliding back and forth or from shifting side to side and from settling downward and rising upward from one paver tile to the next.

Another method used, is filling the void with grout or other bonding material. This method allows for a secure walking surface, but does not allow for easy removal or replacement and fails to provide the means to eliminate grout or bonding for easy installation and assembly. Other methods used, have connecting splines or locking mechanisms installed in a rigid placement in the voids between the tiles and the planer surface. This practice is noted in U.S. Pat. No. 6,761,008 to Chen and U.S. Pat. No. 6,763,643 to Martenson and U.S. Patent Application No. 2004/0228684.A1 to Lombardo. The connecting spline configurations, while connecting the tiles securely on a flat even surface, they fail to provide the means to install or assemble on uneven and unlevel surfaces and fail to provide the means to eliminate gluing or secured by screws or nails. This type of connection fails to provide the means to tilt up or down and could lead to a wide gaping void between tiles or a connection failure resulting in not only a broken and unsafe surface, but a poor appearance.

SUMMARY OF THE INVENTION

The primary object of the invention is to provide a means for the pavers to tilt up and down without separating or leaving a gap in between paver tiles.

Still yet another object of the invention is to provide a means to place or install or assemble on uneven and unlevel surfaces.

A further object of the invention is to provide a means to prevent paver tiles from pulling apart or separating, and from sliding back and forth, or from shifting side to side and from settling downward and rising upward from one paver tile to the next.

Yet another object of the invention is to provide a means to eliminate any type of grout or grouting between paver tiles.

Still yet another object of the invention is to provide a means to eliminate cementing, gluing or securing by screws or nailing the paver tiles.

A further object of the invention is to provide a means to place over existing surfaces.

Yet another object of the invention is to provide a means for a stable walking surface.

Another object of the invention is to provide a means to produce or manufacture out of light weight materials for easy lifting and handling.

Another object of the invention is to provide a means for a fast and simple and an easy way to assemble and install paver tiles.

Another object of the invention is to provide a means to produce or manufacture several different sizes and shapes and several different surface patterns to be able to create an infinite amount of artistic patterns.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed interlocking paver/tile comprising: a plastic spline with gripping teeth, a spline receiver slot or groove on all sides of paver tile, a protruding or extended upper edge or mating radii surrounding the entire perimeter of the paver and allows the pavers to tilt up and down without separating or leaving a gap in-between paver tiles, prevent paver tiles from pulling apart or separating, prevent paver tiles from sliding back and forth or from shifting side to side, prevent paver tiles from settling downward and rising upward from one paver tile to the next, eliminate any type of grout or grouting, cementing, gluing or securing by screws or nails and produced out of light weight materials.

DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

Drawing Figures.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
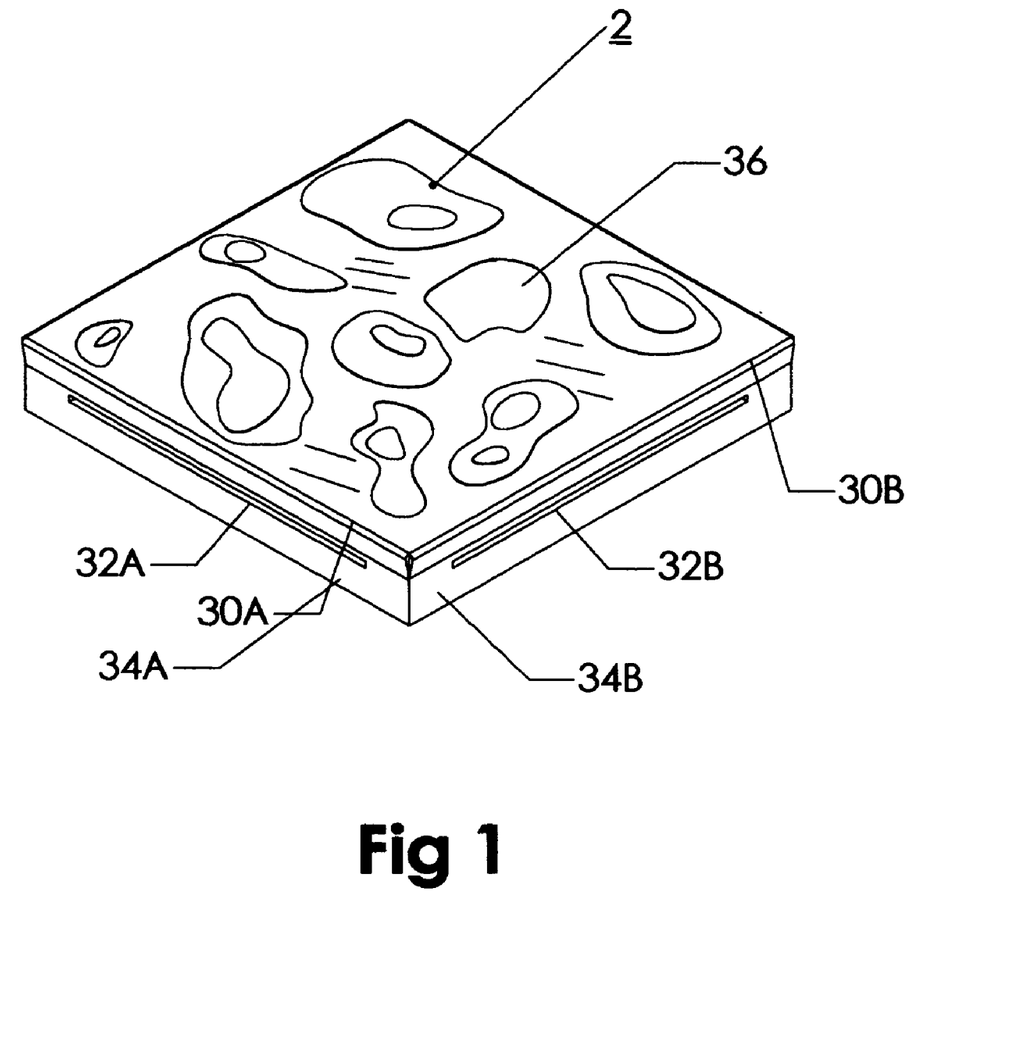
FIG. 1 shows a perspective view of a square paver tile.

Description—FIG. 1

The following detailed description is directed to the presently contemplated mode of carrying out the invention. This description is not intended to be limitative, but to be made solely for the purpose of illustrating the general principles of the invention. The various features and advantages of the present invention may be more readily understood with reference to the following detailed description, taken in conjuncture with the accompanying drawings like numbers refer to the same features or part thereof.

The preferred embodiment of the Interlocking Paver/Tiles of the present invention is illustrated in FIG. 1. A perspective view of the Paver Tile 2 comprised of a mixture of concrete containing light weight lava rock and light weight lava sand, which reduces the overall weight of the tile over standard rock and sand. This depiction shows the mating radii 30A and 30B. Each of the radii 30A and 30B has a mirror image opposite each other forming a perimeter around the upper edge of the paver tile 2. There are spline receiver slots 32A and 32B arranged perpendicular to the paver tile vertical planer surfaces 34A and 34B. There is a mirror image of slots 32A and 32B in the opposite vertical planer surfaces 34A and 34B establishing a 360 degree perimeter of slots around the paver tile 2. The paver tile 2 has a top planer surface 36 that can have a multitude of different surfaces and textures cast into it and a paver tile bottom planer 44 surface to mate to the underlying surface 6. This creates a stable walking surface.

FIGS. 2–5A—Additional Embodiments

Figure 2:
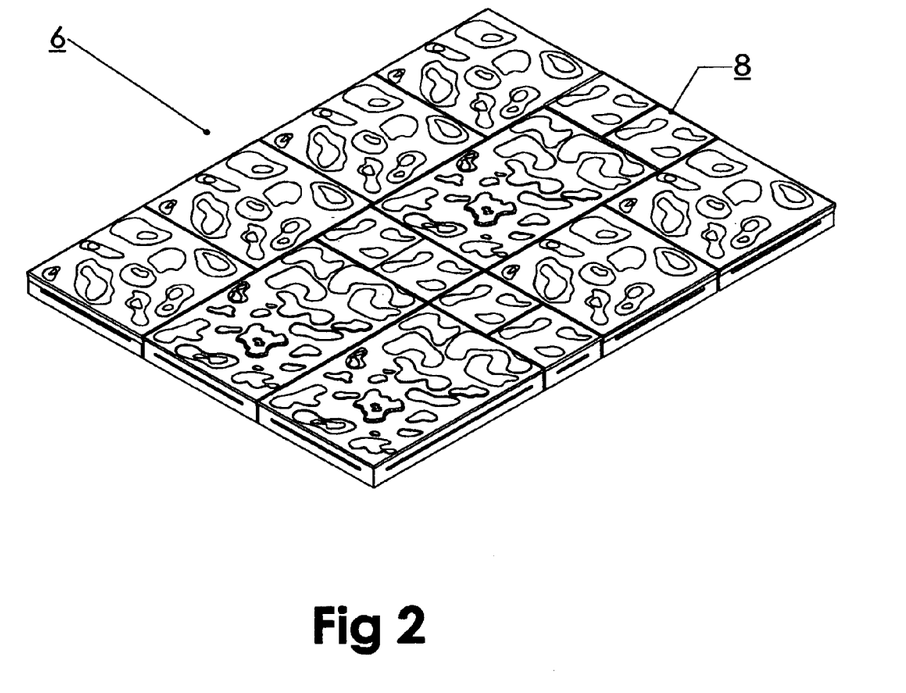
FIG. 2 shows a perspective view of the Interlocking Paver/Tiles laying upon a yard surface.

FIG. 2 is a perspective, illustrative depiction of the Interlocking Paver/Tiles 8, combining several different sizes of paver tiles 2 arranged to form a large walking surface. These Paver Tiles 2 can be manufactured in an infinite number of sizes and shapes in order to create an artistic pattern.

Figure 3:
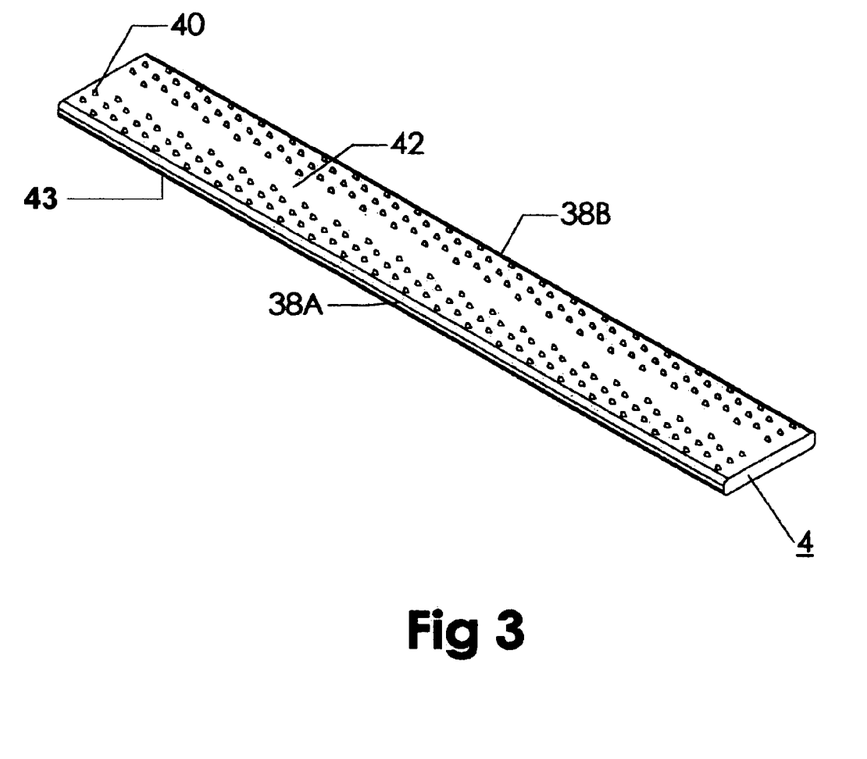
FIG. 3 shows a perspective view of the connecting spline.

FIG. 3 is a perspective view of the paver tile spline 4 showing the 38A and 38B spline edge radii, as well as, the spline gripper teeth 40. The spline gripper teeth 40 are arranged in numerous rows and staggered to accommodate severe angular displacement that might be encountered during installation. The spline gripper teeth 40 are homogeneous with the spline top and bottom planer surfaces 42 and 43. The entire attaching spline is manufactured with a, but not limited to a polymer material. This is to allow the spline 4 to be flexible enough to afford some angular distortion without compromising the integrity between the paver tiles 2.

Figure 3A:
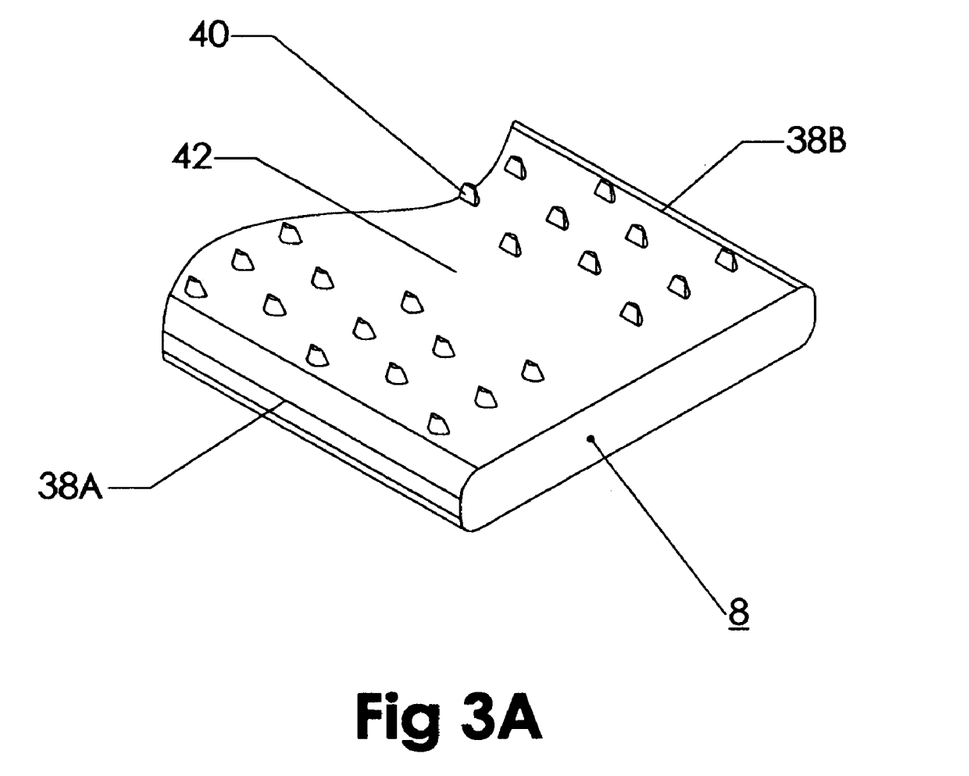
FIG. 3A shows a perspective sectional view of the connecting spline.

FIG. 3A is a close-up perspective sectional view of paver tile spline 4 showing the 38A and 38B spline edge radii, as well as the spline gripper teeth 40. As noted in FIG. 3A the gripper teeth 40 are shaped in such a manner so that the gripper teeth 40 allow the paver tile spline to be inserted into the spline receiver slots 32A and 32B with relative ease, but resist removal with a higher level of resistance. The spline edge radii 38A and 38B are designed so that the paver tile spline 4 can be inserted into the spline receiver slots 32A and 32B easily.

Figure 4:
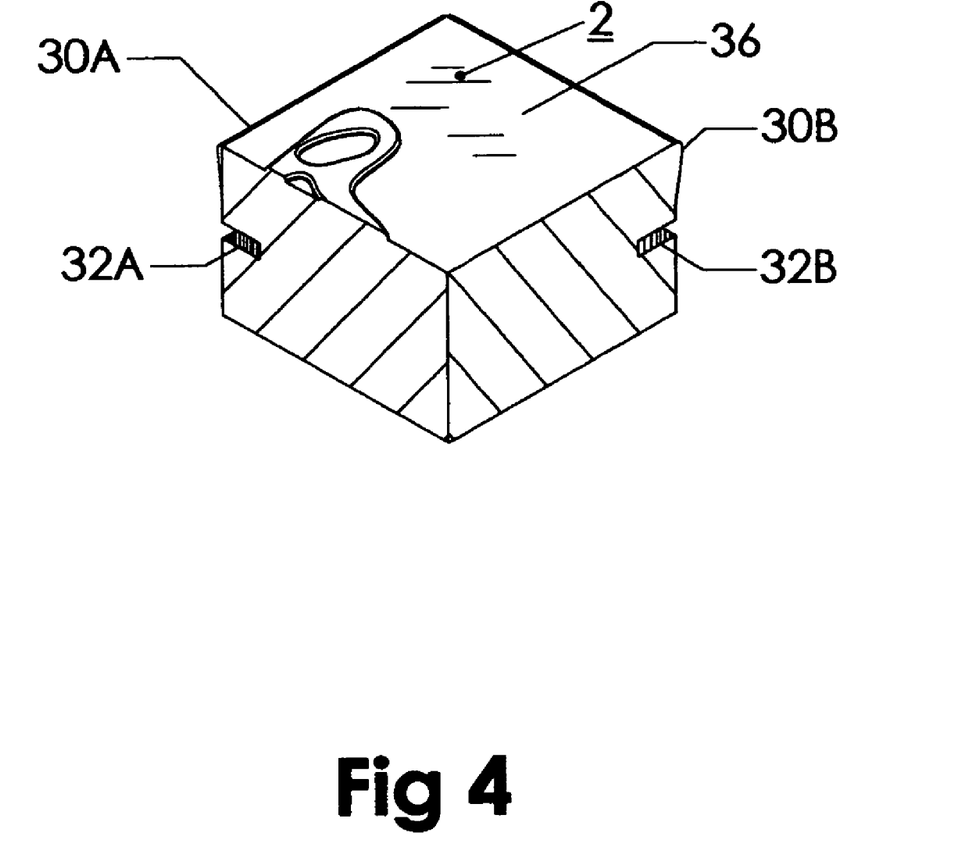
FIG. 4 shows a perspective cut-away view of the paver tile showing the spline retaining slots and mating radii.

FIG. 4 is a perspective sectional view of the corner of the paver tile 2. This view shows the relative placement of the paver tile mating radii 30A and 30B in relation to the paver tile top planer surface 36. It also shows the relation of the spline receiver slots 32A and 32B with the paver tile top planer surface 36.

Figure 4A:
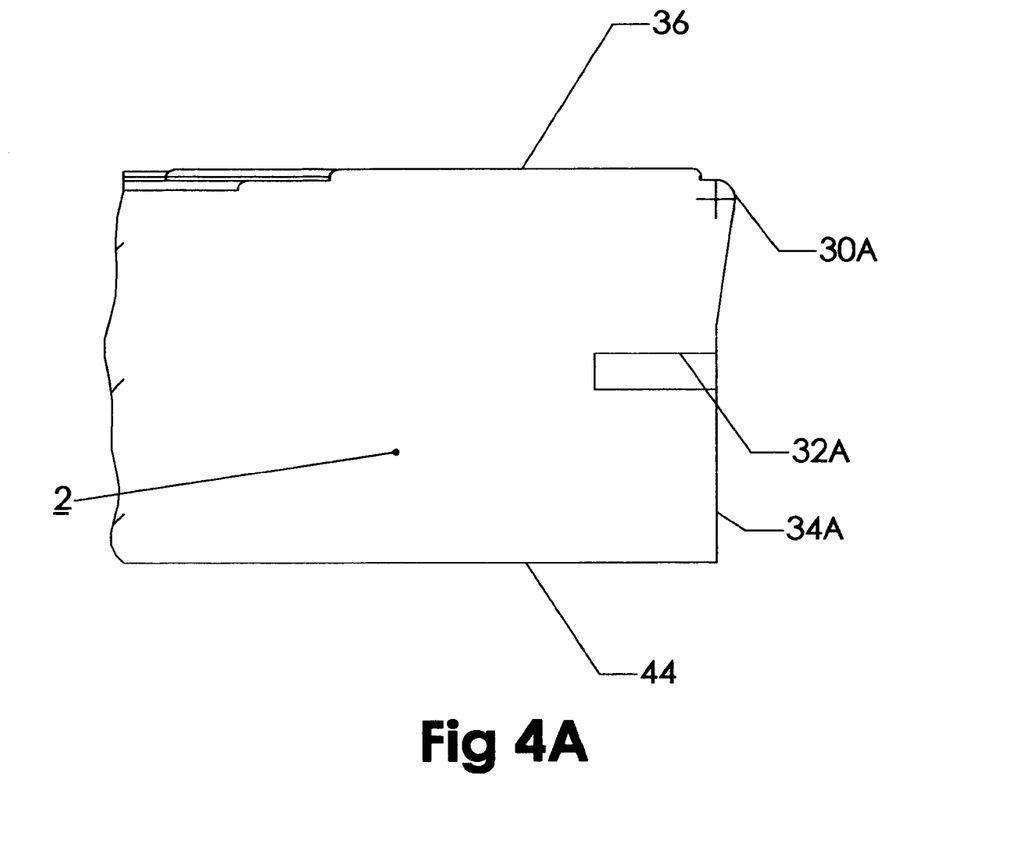
FIG. 4A shows a close-up sectional end view of a paver tile.

FIG. 4A is a close-up cutaway end view of the paver tile 2 depicting the mating radius 30A, the spline receiver slot 32A and the paver tile vertical planer surface 34A in relation to the paver tile bottom planer surface 44.

Figure 5:
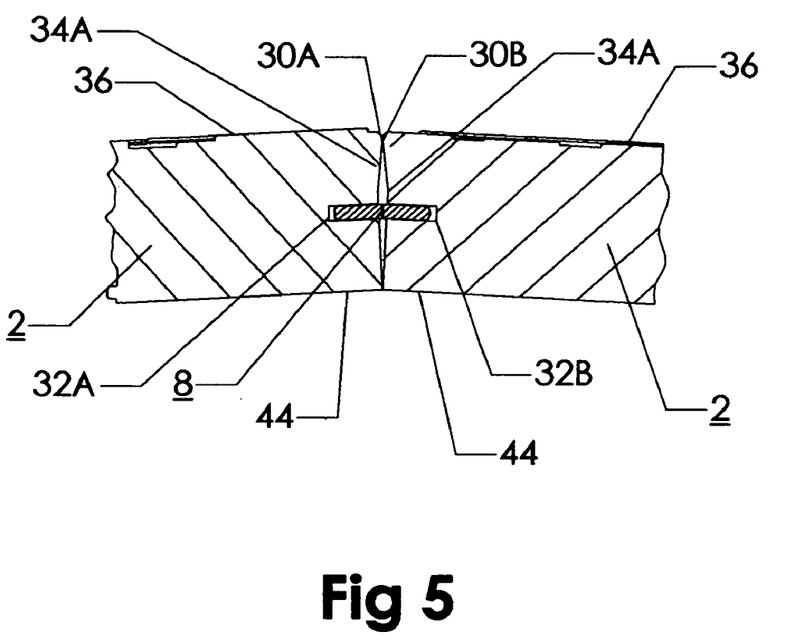
FIG. 5 shows a sectional view of two paver blocks joined together in the tilt down position.

FIG. 5 is a cut-away end view depicting two paver tiles 2 with the paver tile mating radii 30A and 30B in contact and the paver tile vertical planer surfaces 34A and 34B fully displaced from their parallel alignment. This causes the paver tile top planer surfaces 36 to angle up towards each other, thus allowing the paver tile bottom planer surfaces 44 to adjust to the unevenness that may be encountered in the attaching floor surface 6.

Figure 5A:
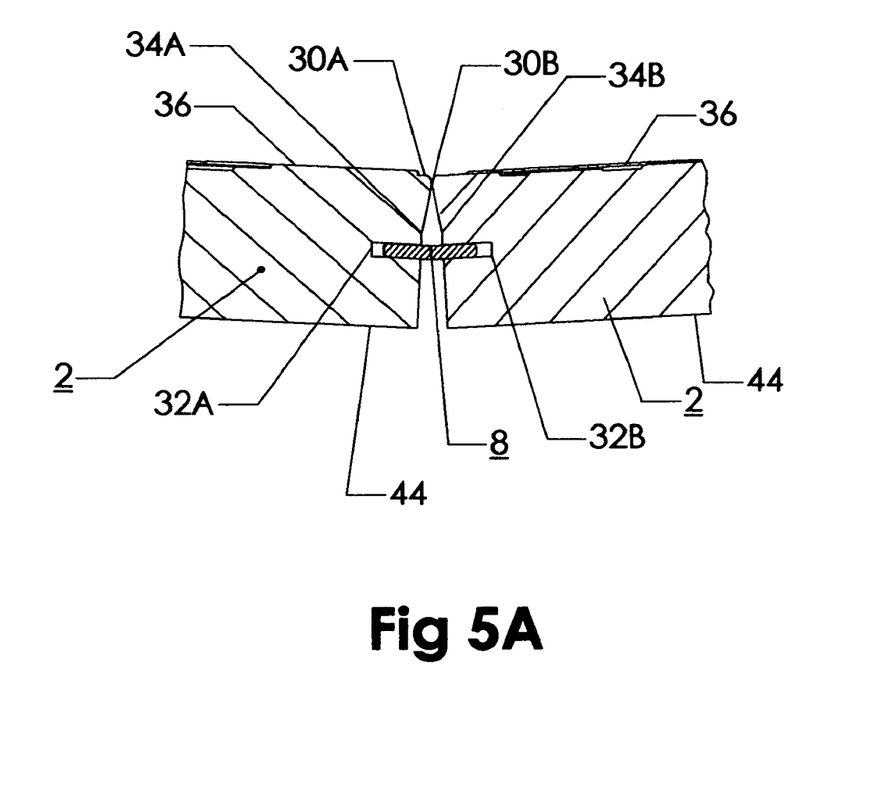
FIG. 5A shows a sectional view of two paver tiles joined together in the tilt up position.

FIG. 5A is a cut-away end view depicting two paver tiles 2 with the paver tile mating radii 30A and 30B in contact and with the paver tile vertical planer surfaces 34A and 34B fully displaced from their parallel alignment. This causes the paver tile top planer surfaces 36 to angle down towards each other, thus allowing the paver tile bottom planer surfaces 44 to adjust to the unevenness that may be encountered in the attaching floor surface 6.

OPERATION OF INVENTION

The preferred embodiment of the Interlocking Paver/Tiles of the present invention is illustrated in FIG. 1, a perspective view of the paver tile 2 comprised of a mixture of concrete containing light weight lava rock and light weight lava sand. The mixture reduces the overall weight of the tile over standard rock and sand. The depiction shows the mating radii 30A and 30B. Each of the radii 30A and 30B has a mirror image opposite each other forming a perimeter around the upper edge of the paver tile 2. There are spline receiver slots 32A and 32B arranged perpendicular to the paver tile vertical planer surfaces 34A and 34B. The paver receiver slots 32A and 32B and their mirror images are designed to receive the attaching spline 4, which is of a polymer type material that allows for angular displacement of the spline planer surfaces 42A and 42B. This displacement allows for the angular displacement between the paver tile top planer tile surfaces 36 from the paver tile top surface of another paver tile 2. Inserting the attaching spline 4 is accomplished by driving the attaching spline 4 into the paver receiver slots 32A or 32B of an additional paver tile 2 and driving the paver tile 2 onto the attaching spline until seated against the corresponding paver tile mating radii 30A of each paver tiles 2. Continue this process until the floor surface 6 that is desired is complete. There is a mirror image of slots 32A and 32B in the opposite vertical planer surfaces 34A and 34B establishing a 360 degree perimeter of slots around the paver tile 2. The paver tile 2 has a top planer surface 36, that can have a multitude of different surfaces and textures cast into it, and a paver tile bottom planer surface 44 to mate to the floor surface 6. FIG. 5 is a cut-away end view depicting two paver tiles 2 with the paver tile mating radii 30A and 30B in contact and the paver tile vertical planer surfaces 34A and 34B fully displaced from their parallel alignment. This causes the paver tile top planer surfaces 36 to angle up towards each other, allowing the paver tile bottom planer surfaces 44 to adjust to the unevenness that may be encountered in the attaching floor surface 6. And consequently, FIG. 5A shows a cut-away end view depicting two paver tiles 2 with the paver tile mating radii 30A and 30B in contact and with the paver tile vertical planer surfaces 34A and 34B fully displaced from their parallel alignment. This causes the paver tile top planer surfaces 36 to angle down towards each other, allowing the paver tile bottom planer surfaces 44 to adjust to the unevenness that may be encountered in the attaching floor surface 6.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An interlocking paver/tile comprising:
    a block of light weight materials from the group comprising of lava rock, lava sand or mixtures thereof,
    a horizontal lip protruding from an upper edge surrounding the entire upper half of the paver which when placing pavers together end to end or side to side on an uneven surface allows the individual paver to tilt up or down by rotating or pivoting on the edge of the upper lip;
    a slot or groove on all sides of paver tile for receiving;
    a spline which is made of flexible plastic and having gripping teeth for connecting one paver to another paver by forcing the teeth of the spline into frictional engagement with upper and lower surfaces of the groove or slot.

2. A method of interlocking paving tiles comprising the steps of:
    Providing a plurality of paving tiles consisting of materials from the group including lava rock, lava sand or mixtures thereof; and having a horizontally protruding lip extending from an upper peripheral edge, and a horizontal groove slot or groove on each lateral side of said paving tile;
    Placing said plurality of paving stones on a surface,
    Inserting a flexible gripping spline into at least one respective slot or groove, such that at least one gripping tooth is in frictional contact with an upper or lower interior surface of said slot or groove;
    Connecting said adjacent, interlocking paving tiles together in said to side and end to end fashion via said at least one gripping spline;
    Disposing said protruding edges of adjacent paving tiles together, without separating or leaving a gap between said paving tiles, thereby forming a continuous paving tile surface on level or un-level surfaces.

* * * * *